United States Patent
Lombardo et al.

(10) Patent No.: US 11,578,257 B2
(45) Date of Patent: Feb. 14, 2023

(54) HYDRAULIC FRACKING FLUID FOR GENERATING PROPPANTS IN SITU AND FRACKING METHOD WITH PROPPANT GENERATION IN SITU

(71) Applicant: YPF TECNOLOGÍA S.A., Ciudad Autonoma de Buenos Aires (AR)

(72) Inventors: Gabriel Lombardo, Ituzaingo (AR); Maria Laura Vera, Ranelagh (AR); Pablo Alejandro Raffo, Ciudad Autonoma de Buenos Aires (AR); Simón Marco, La Plata (AR); Marcos Eduardo Coustet, La Plata (AR); Roque Carlos Dietrich, La Plata (AR)

(73) Assignee: YPF TECNOLOGIA S.A., Ciudad Autónoma de Buenos Aires (AR)

( * ) Notice: Subject to any disclaimer, the term of this patent is extended or adjusted under 35 U.S.C. 154(b) by 0 days.

(21) Appl. No.: 17/192,702

(22) Filed: Mar. 4, 2021

(65) Prior Publication Data
US 2021/0277300 A1     Sep. 9, 2021

Related U.S. Application Data

(60) Provisional application No. 62/985,486, filed on Mar. 5, 2020.

(51) Int. Cl.
| | | |
|---|---|---|
| C09K 8/68 | (2006.01) | |
| C09K 8/66 | (2006.01) | |
| E21B 43/26 | (2006.01) | |
| C09K 8/60 | (2006.01) | |
| C09K 8/80 | (2006.01) | |
| E21B 43/267 | (2006.01) | |
| E21B 43/22 | (2006.01) | |

(52) U.S. Cl.
CPC ................ *C09K 8/68* (2013.01); *C09K 8/607* (2013.01); *C09K 8/665* (2013.01); *C09K 8/80* (2013.01); *E21B 43/26* (2013.01)

(58) Field of Classification Search
CPC ........ E21B 43/26; E21B 21/003; E21B 21/00; E21B 43/16; E21B 43/267
See application file for complete search history.

(56) References Cited

U.S. PATENT DOCUMENTS

2015/0083652 A1* 3/2015 Hawks ...................... C02F 9/00
210/295

FOREIGN PATENT DOCUMENTS

CA      2875725 A1 * 12/2013 ............... C09K 8/52

OTHER PUBLICATIONS

Chang et al., "In-Situ Formation of Proppant and Highly Permeable Blocks for Hydraulic Fracturing," 2015, SPE International, SPE173328, 10 pages.
Tong et al., "Generation of In-Situ Proppant through Hydro-Thermal Reactions," The University of Audtin at Texas, 2019, SPE-194320-MS.

* cited by examiner

*Primary Examiner* — Zakiya W Bates
(74) *Attorney, Agent, or Firm* — Muncy, Geissler, Olds & Lowe, P.C.

(57) ABSTRACT

A hydraulic fracking aqueous fluid, including: water; one or more soluble calcium salts; a carbonate ion generating compound; and one or more soluble zinc salts. A method for fracking an underground formation using the hydraulic fracking fluid.

12 Claims, 12 Drawing Sheets

HYDRAULIC FRACKING FLUID FOR GENERATING PROPPANTS IN SITU AND FRACKING METHOD WITH PROPPANT GENERATION IN SITU

CROSS REFERENCE TO RELATED APPLICATIONS

This application claims priority of U.S. Provisional Application No. 62/985,486 filed on Mar. 5, 2020 under 35 U.S.C. § 119(e), the entire contents of all of which are hereby incorporated by reference.

FIELD OF THE INVENTION

The present invention relates to a hydraulic fluid useful in fracking operations in oil shale wells. In particular, the present invention relates to a hydraulic fluid capable of generating proppants within the subterranean formation being fractured.

BACKGROUND OF THE INVENTION

Shale oil wells need to be fractured in order to enhance natural formation fractures and form new long and entangled fractures. The fracture network formed thereby shows high permeability channels and allows obtaining the oil that is embedded in the formation rock. However, the formation fractures tend to close or collapse due to the existing pressure and stresses in the formation rock, and therefore the fractures are typically kept open by placing proppants therein carried by a suitable fluid. The development of new proppants of different kinds with improved or customized properties has been rapidly increasing in the last decades.

One main drawback of typical proppants is their rapid settlement in low viscosity fluids what prevents the proppants from flowing far into the fractures. Currently, this situation is dealt with by increasing pumping flow rates and drastically decreasing the proppant particle size. Nevertheless, the proppant settlement cannot be completely avoided, and proppants cannot reach the farthest zones of the well. Thus, only about 20%-50% of fractured volume is typically effectively propped up and the remaining 50%-80% of the volume reached by the fracture fluid will remain unpropped with a very low oil production.

Acid treatments have been suggested for chemically stimulating shale oil rock and increase fracture conductivity, but treatments of this kind often result in shale softening and conductivity spoilage.

It has been recently suggested that a possible way of overcoming said drawback was the generation of proppants in situ, i.e. within the formation, even in the farthest zones the fracture fluid can reach. To this end. Chang et al. (*In-Situ Formation of Proppant and Highly Permeable Blocks for Hydraulic Fracturing*. Oil Chem Technologies. 2015. SPE-173328-MS) proposed the injection of polymer-based solutions to generate spherical polymeric particles in situ. However, the viscosity of the designed fluid would affect the desired fracture complexity for shale rocks. In addition, the type of proppants obtained are too deformable and are not suitable for improving fracture conductivity.

Songyang Tong, et al. (*Generation of In-Situ Proppant through Hydro-Thermal Reactions*. The University of Texas at Austin. 2019. SPE-194320-MS) suggested hydro-thermal reactions to generate HAp (Hydroxyapatite) crystals on calcite-rich shale surface to act as in-situ proppants to improve fracture conductivity. Hydroxyapatite ($Ca_{10}(PO_4)_6(OH)_2$) ranks 5 in Mohs hardness scale. Calcite can be converted to HAp through hydrothermal dissolution/precipitation reactions. The main disadvantage of this system is that the areal concentration of the proppant generated depends on the amount of calcite present in the rock formation, that means, the proppant will probably not be generated in calcite-free or low concentration calcite shale surface.

Thus, there remains an unmet need of new methods of preparing proppants deep within the rock formation fractures that typical commercial proppants do not reach because of their early settlement.

BRIEF DESCRIPTION OF THE INVENTION

The above-mentioned drawbacks are now overcome by the present invention that provides a hydraulic fracking aqueous fluid for generating proppants in situ, within the shale rock formation. The proppants are thus generated deep within the fractures where currently known proppants cannot reach.

The present invention also provides a method of propping up shale rock fractures by means of a hydraulic fracking aqueous fluid that generates proppants in situ.

It was unexpectedly found that a controlled precipitation of a calcium/zinc carbonate complex may be produced within the formation shale rock by means of a hydraulic aqueous fluid comprising calcium and zinc cations, under the thermal conditions within the formation fractures. The solid calcium/zinc carbonate particles thus obtained have improved sphericity, compressive strength, and roundness and are able to keep shale rock fractures propped up.

The hydraulic fracking aqueous fluid of the invention, due to its low viscosity, allows leading the shale rock fracturing, following a pumping step with mean- and high-viscosity fluids.

Once the pumping step is finished, as the heat transfer between fluids and rock is being completed the fluid of the invention will start generating said solid and spherical particles that will allow propping up fractures so as to keep them open and producing oil from the farthest well zones.

Therefore, in a first aspect, the invention provides a hydraulic fracking aqueous fluid comprising:
  water;
  one or more soluble calcium salts;
  a carbonate ion generating compound; and
  one or more soluble zinc salts In an embodiment of the first aspect of the present invention, the water is fresh water or salt water.

In another embodiment of the first aspect of the present invention, the water also comprises monovalent cation salts.

In another embodiment of the first aspect of the present invention, the water comes from a source selected from rivers or other surface-water streams, and groundwater.

In yet another embodiment of the first aspect of the present invention, the water comes from a source selected from production water and flowback water from oil well exploitation.

In a preferred embodiment of the first aspect of the invention, the water comprises calcium salts.

In a preferred embodiment of the invention, the soluble calcium salt is selected from the group of calcium chloride, calcium bromide or calcium fluoride.

In a preferred embodiment of the invention, the soluble calcium salt is selected from the group of calcium chloride, calcium bromide or calcium fluoride, all preferably (but not limited) in a concentration between 0.4 and 2.4 M of equivalent calcium.

In a preferred embodiment of the invention, the soluble zinc salt is selected from the group of zinc acetate, zinc nitrate, zinc chloride, zinc hydroxide or zinc sulfide.

In a preferred embodiment of the invention, the soluble zinc salt is selected from the group of zinc acetate, zinc nitrate, zinc chloride, zinc hydroxide or zinc sulfide, all preferably (but not limited) in a concentration between 0.1 and 0.4 M of equivalent zinc.

In an embodiment of the present invention, the carbonate ion generating compound is urea.

In an embodiment of the present invention, the carbonate ion generating compound is urea preferably (but not limited) in a concentration between 0.4 and 2 M.

In a second aspect, the invention provides a method of fracking a shale formation and propping up shale rock fractures comprising the steps of:
a) mixing water with a soluble calcium salt;
b) adding to the mixture obtained in a) a carbonate ion generating compound
c) adding to the mixture obtained in b) a soluble zinc salt, obtaining thus a hydraulic aqueous fluid;
d) injecting under pressure the hydraulic aqueous fluid obtained in c) into the shale rock formation in order to produce rock fractures; and
e) letting the injected hydraulic aqueous fluid to warm under the temperature and pressure conditions within the formation in order to generate carbonate ions from the carbonate ion generating compound and produce a calcium/zinc carbonate precipitate that will prop up the rock fractures.

In an embodiment of the second aspect of the present invention, the water is fresh water or salt water.

In another embodiment of the first aspect of the present invention, the water also comprises monovalent cation salts.

In another embodiment of the second aspect of the present invention, the water comes from a source selected from rivers or other water streams and groundwater.

In yet another embodiment of the second aspect of the present invention, the water comes from a source selected from production water and flowback from oil well exploitation.

In a preferred embodiment of the second aspect of the invention, the water comprises calcium salts.

In a preferred embodiment of the invention, the soluble calcium salt is selected from the group of calcium chloride, calcium bromide or calcium fluoride.

In a preferred embodiment of the invention, the soluble calcium salt is selected from the group of calcium chloride, calcium bromide or calcium fluoride, all preferably (but not limited) in a concentration between 0.4 and 2.4 M of equivalent calcium.

In a preferred embodiment of the second aspect of the invention, the soluble zinc salt is selected from the group of zinc acetate, zinc nitrate, zinc chloride, zinc hydroxide or zinc sulfide.

In a preferred embodiment of the invention, the soluble zinc salt is selected from the group of zinc acetate, zinc nitrate, zinc chloride, zinc hydroxide or zinc sulfide, all preferably (but not limited) in a concentration between 0.1 and 0.4 M of equivalent zinc.

In an embodiment of the second aspect of the present invention, the carbonate ion generating compound is urea.

In an embodiment of the present invention, the carbonate ion generating compound is urea preferably (but not limited) in a concentration between 0.4 and 2 M.

DETAILED DESCRIPTION OF THE INVENTION

The hydraulic fracking aqueous fluid of the invention may hereinafter be simply designated as "fracking fluid".

The fracking fluid of the invention is furtherly advantageous since it can be prepared based on water from any water source typically present in oil industry. Calcium salts typically present in said water sources are consumed during the proppant formation, while sodium, barium and magnesium salts, also typically present in said water sources, help in segregating proppant particles.

The addition of soluble zinc salts to the hydraulic aqueous fluid is decisive in the final form of the obtained particles. To obtain particles with the desired compressive strength, sphericity and roundness, the incorporation of zinc to the particle matrix is necessary, forming a calcium and zinc carbonates complex. This incorporation is achieved by means of a controlled coprecipitation.

In order to achieve said controlled precipitation, a carbonate ion generating compound, preferably urea, is added to the fracking fluid as a reaction initiator and carbonate ion provider. In case of using urea, it decomposes under the formation conditions, releasing ammonia into the aqueous media and thus increasing pH and favoring the reaction that produces the calcium and zinc carbonate particles and thus the desired proppant. The decomposition of the carbonate ion generating compound starts when submitted to a pressure and temperature increase, i.e. when introduced into the formation, and thus the fracking fluid is kept in the form of a homogeneous solution until being used within the oil well.

The invention will be described in detail by means of the following examples that are intended to illustrate preferred embodiments. In no way they are to be considered as limiting the scope of the invention.

Example 1

A fracking fluid was prepared by mixing urea, zinc acetate and FlowBack water at room temperature. The fracking fluid thus obtained was placed in a reactor and tested at 10,000 psi and 220° F. for 48 h, in order to produce a precipitate. The fluid formulation was as follows:

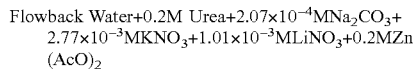
Flowback Water+0.2M Urea+2.07×10$^{-4}$MNa$_2$CO$_3$+ 2.77×10$^{-3}$MKNO$_3$+1.01×10$^{-3}$MLiNO$_3$+0.2MZn (AcO)$_2$

Figure 1:
FIGS. 1 and 2 show microscopic views of proppant particles obtained with the fracturing fluid provided by the invention in accordance with the exemplary embodiment of Example 1.
Figure 2:
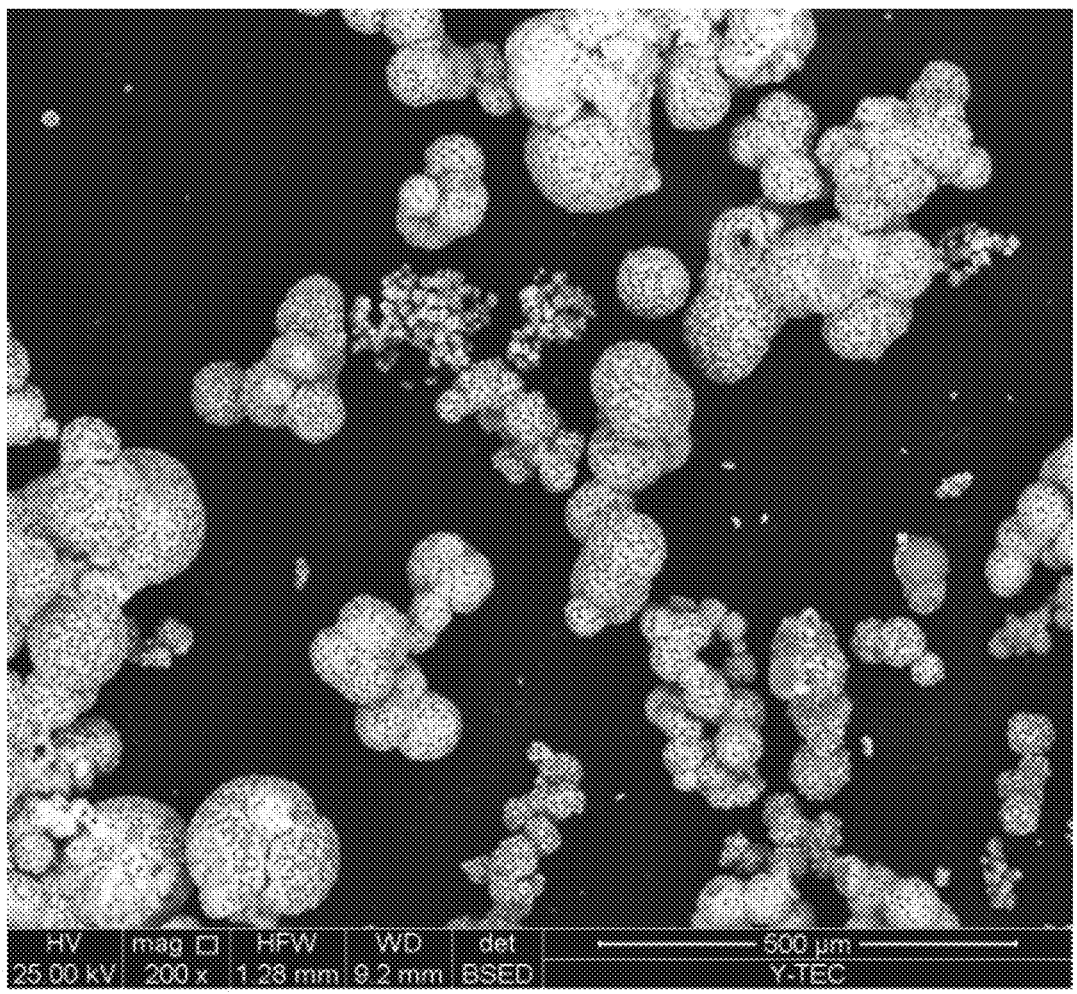

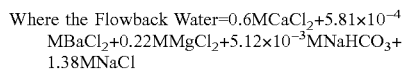
Where the Flowback Water=0.6MCaCl$_2$+5.81×10$^{-4}$ MBaCl$_2$+0.22MMgCl$_2$+5.12×10$^{-3}$MNaHCO$_3$+ 1.38MNaCl Very consolidated proppant particles were obtained, with very good sphericity and good roundness. Moreover, the particles had an average particle size between 50 and 100 μm, good size dispersion and acceptable shape homogeneity. See FIGS. 1 and 2.

Example 2

A fracking fluid was prepared by mixing urea, zinc acetate and synthetic FlowBack water at room temperature. The fracking fluid so obtained was placed in a reactor and tested at 10,000 psi and 220° F. for 6 h, in order to produce a precipitate. The fluid formulation was as follows:

Flowback Water+0.2M Urea+0.2MZn(AcO)$_2$

Figure 3:
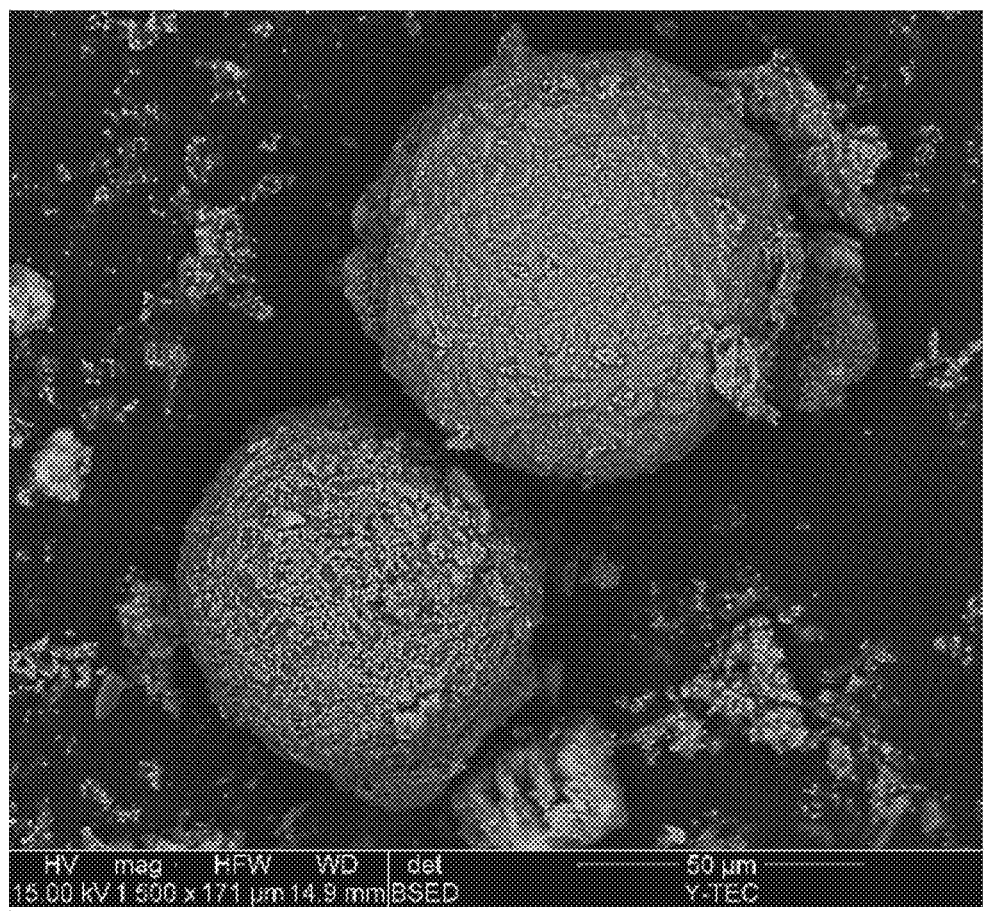
FIGS. 3 and 4 show microscopic views of proppant particles obtained with the fracturing fluid provided by the invention in accordance with the exemplary embodiment of Example 2.
Figure 4:
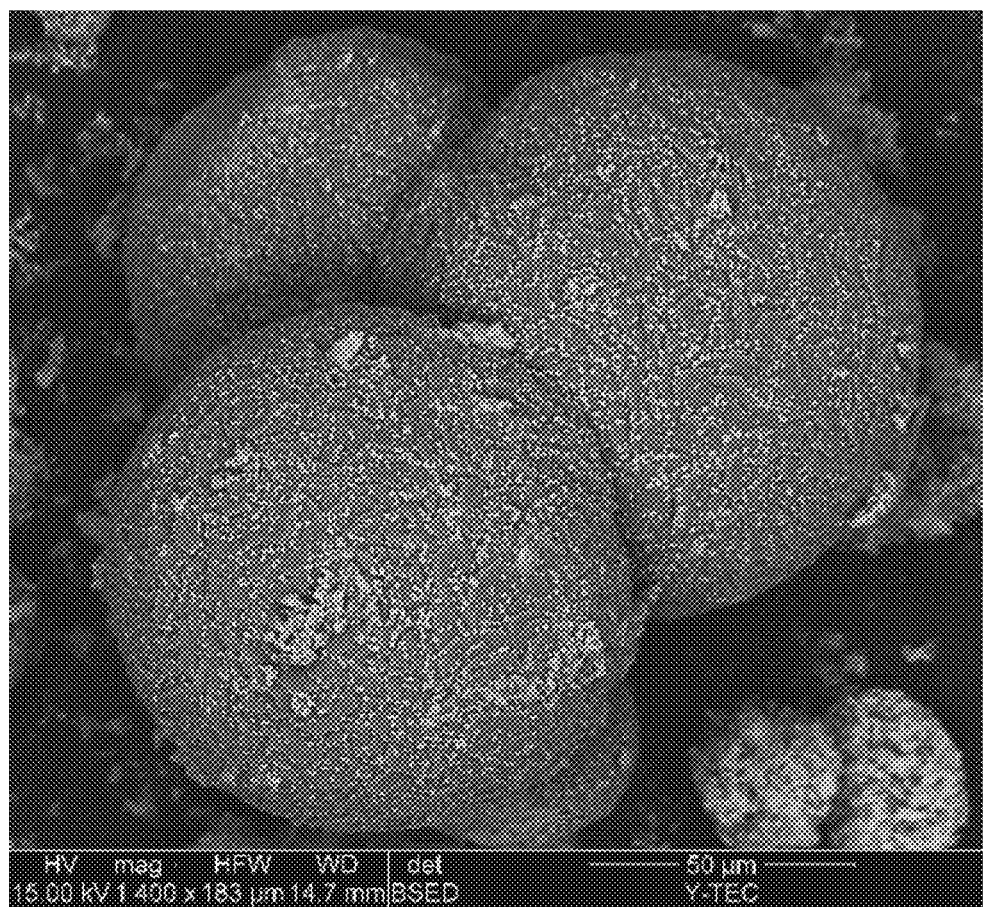

Flowback Water=0.6MCaCl$_2$+5.81×10$^{-4}$MBaCl$_2$+ 0.22MMgCl$_2$+5.12×10$^{-3}$ NaHCO$_3$+1.38MNaCl The obtained proppant particles are well dispersed and show adequate properties, and an average particle size of about 50-70 μm as shown in FIGS. 3 and 4.

Example 3

A fracking fluid was prepared by mixing urea, zinc acetate and calcium chloride into fresh water at room temperature. The fracking fluid so obtained was placed in a reactor and tested at 10,000 psi and 220° F. for 6 h, in order to produce a precipitate. The fluid formulation was as follows;

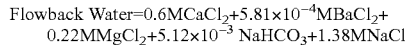
Fresh Water+0.6MCaCl$_2$+0.8M Urea+0.15MZn (AcO)$_2$

Figure 5:
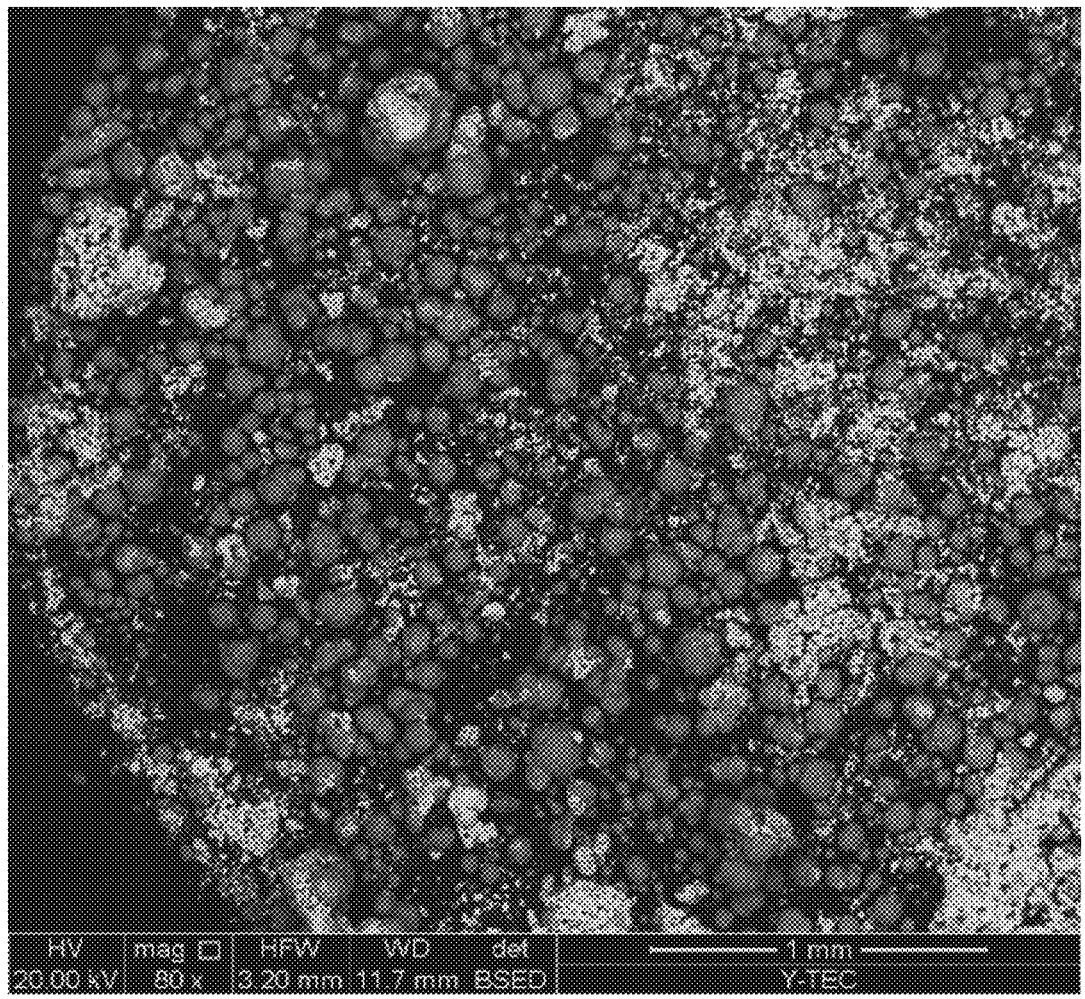
FIGS. 5 and 6 show microscopic views of proppant particles obtained with the fracturing fluid provided by the invention in accordance with the exemplary embodiment of Example 3.
Figure 6:
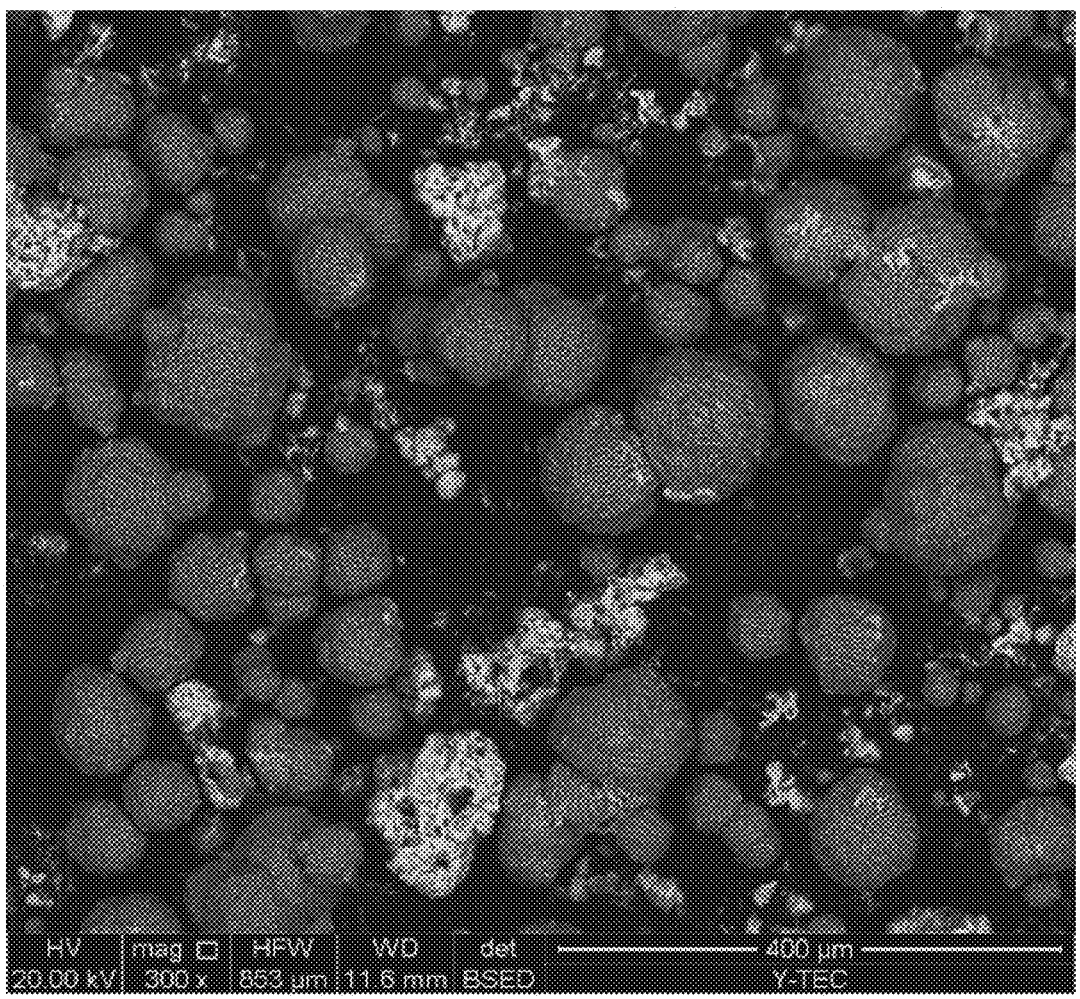

The obtained proppant particles are similar to those obtained in Example 2, as shown in FIGS. 5 and 6.

Example 4: Crush Test Results

Samples of proppant obtained in Example 1 were submitted to a Crush Test by placing the sample in a cell with a linear compression piston at 4,000 psi. The test results were observed through a binocular magnifying loupe.

Only 10% of the total number of particles were found to be crushed. The appearance of the breaking zones indicated a fragile and non-ductile particle behavior, as may be seen in FIG. 7.

Figure 7:
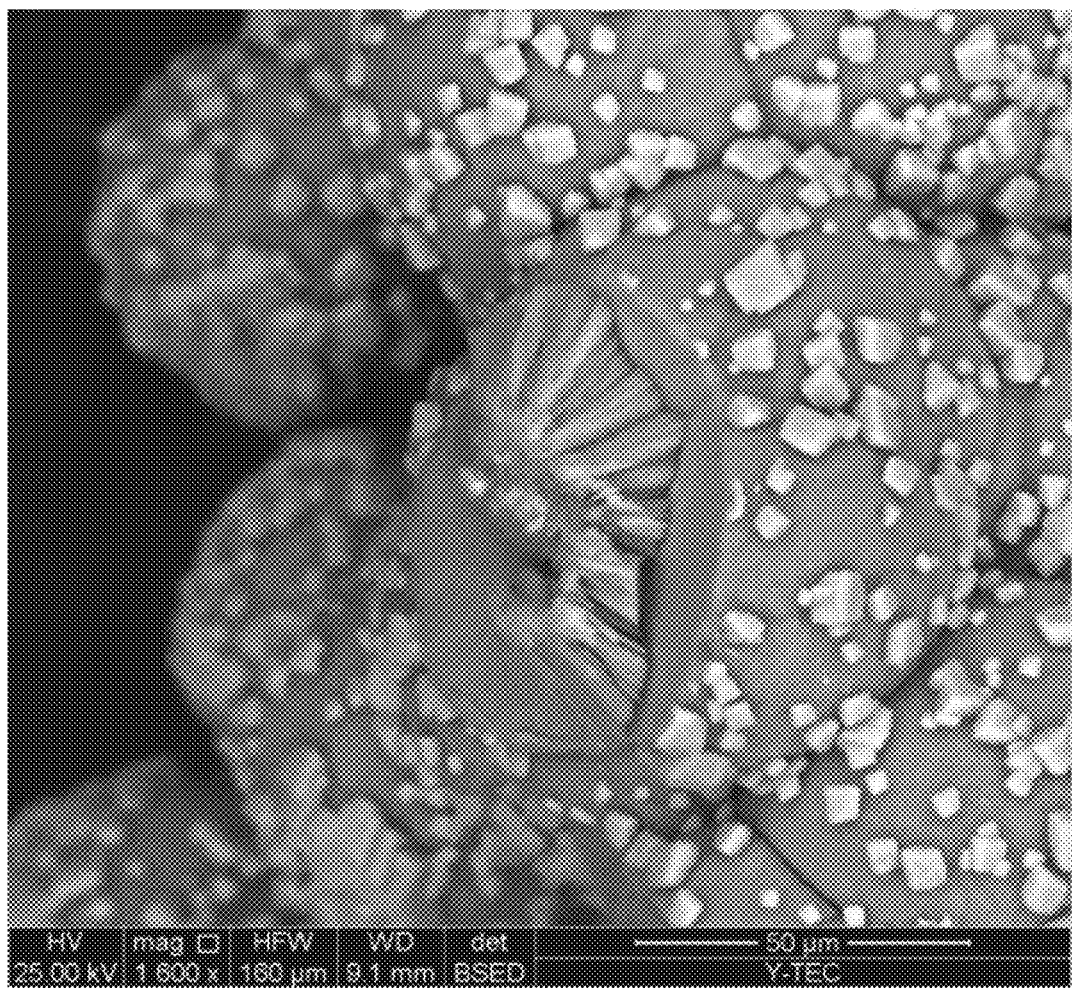
FIG. 7 show microscopic views of proppant particles comprising breaking zones after the crush test of Example 4.

FIG. 7 shows solid and robust particles, with structures formed around an original nucleus. SEM analysis showed that the nucleus consisted of zinc, the matrix around which presented a high calcium content that gradually decreased when approaching the particle shell that presented a high zinc content. On the outside the particles showed pure zinc crystals adhered thereto.

In all cases the particles presented internal solid structures and no porous structures were observed.

Comparative Example 1

Fracking fluids based on magnesium nitrate were prepared by mixing this salt with media containing monovalent salts like lithium, sodium and potassium salts. Three different media were used in the tests, namely: an emulsified media (water-silicone), a low surface tension (water-ethanol) and conventional aqueous media (fresh water).

The tests were performed on the following conditions: 10,000 psi pressure and 220° F. temperature, typical downhole pressure and temperature conditions, for 48 h.

Figure 8:
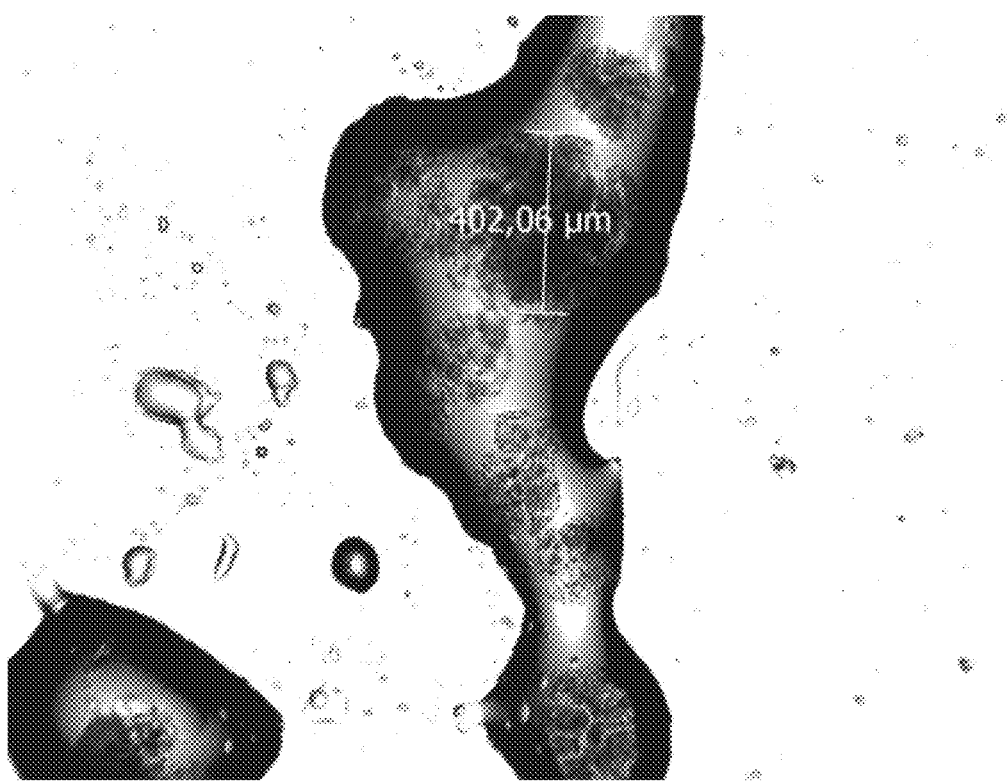
FIG. 8 shows a "wool ball" conformation of proppant particles obtained in Comparative Example 1.

The best results were obtained with the conventional aqueous media, yielding dispersed particles with adequate size, good sphericity and acceptable roundness. These results were obtained with the following fluid:

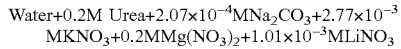
Water+0.2M Urea+2.07×10$^{-4}$MNa$_2$CO$_3$+2.77×10$^{-3}$ MKNO$_3$+0.2MMg(NO$_3$)$_2$+1.01×10$^{-3}$MLiNO$_3$ However, the obtained particles easily disaggregated under ultrasound, since they presented a conformation like a "wool ball", as can be seen in FIG. 8, with a very high water content and thus being unstable, with low compressive strength and very deformable upon dehydration.

Similar tests were performed using a fracking fluid containing other soluble salts that could coprecipitate with the magnesium nitrate, in order to try to fill the "ball of wool" pores and get particles with good compressive strength. To this end the new tested fracking fluid was based on magnesium nitrate and typical salts contained in FlowBack water.

No acceptable proppant particles were obtained as a result of the tests, since magnesium nitrate is much more soluble than other salts in FlowBack water, separately precipitating and forming rod- or cross-shaped particles.

Comparative Example 2

A test similar to that of Example 3 was performed, with the exception that the fracturing fluid comprises calcium chloride, urea and fresh water according to the following composition:

Fresh Water+0.6MCaCl$_2$)+0.4M Urea

The tests were performed on the following conditions: 10,000 psi pressure and 220° F. temperature, for 6 h.

Figure 9:
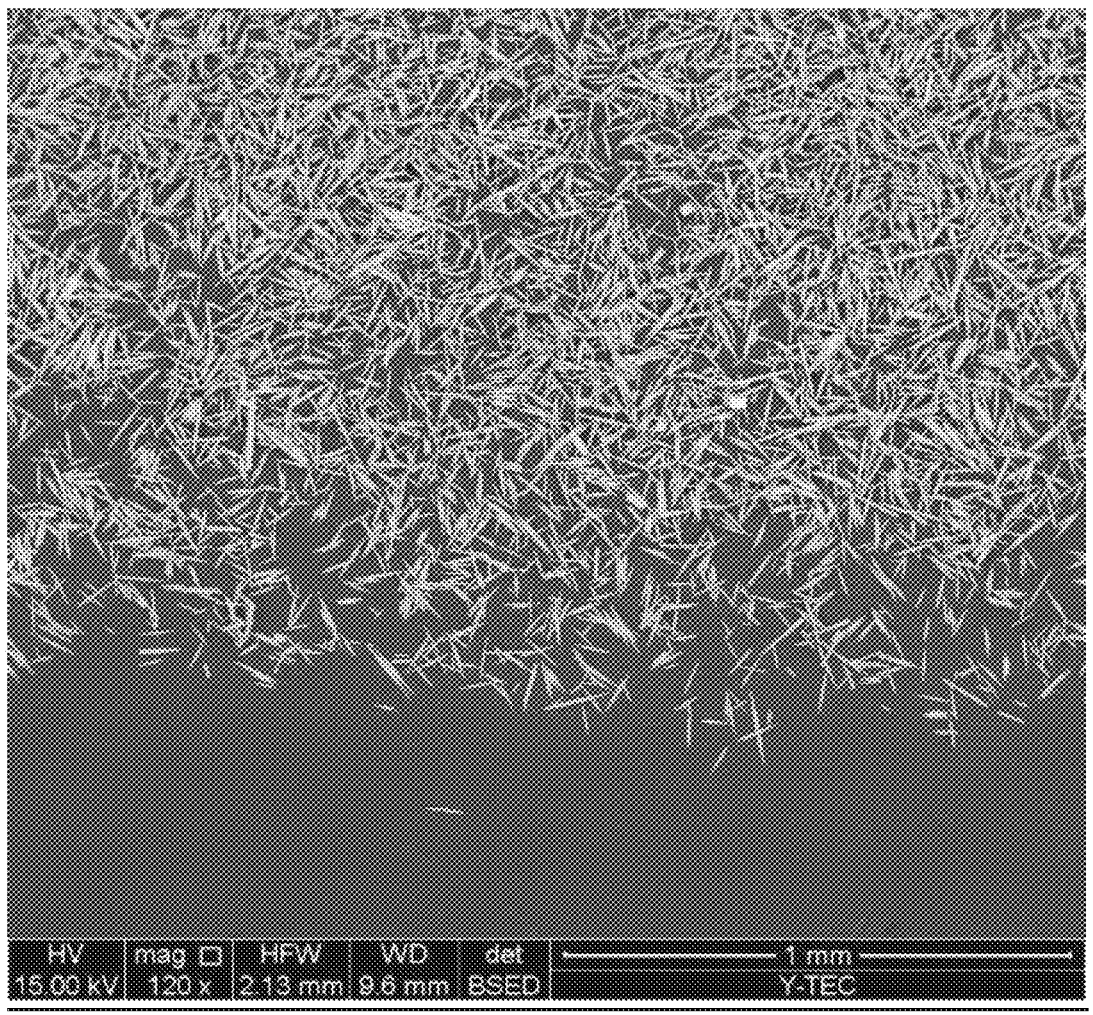
FIGS. 9 and 10 show microscopic views of proppant particles that do not consolidate as spherical particles, obtained in Comparative Example 2.
Figure 10:
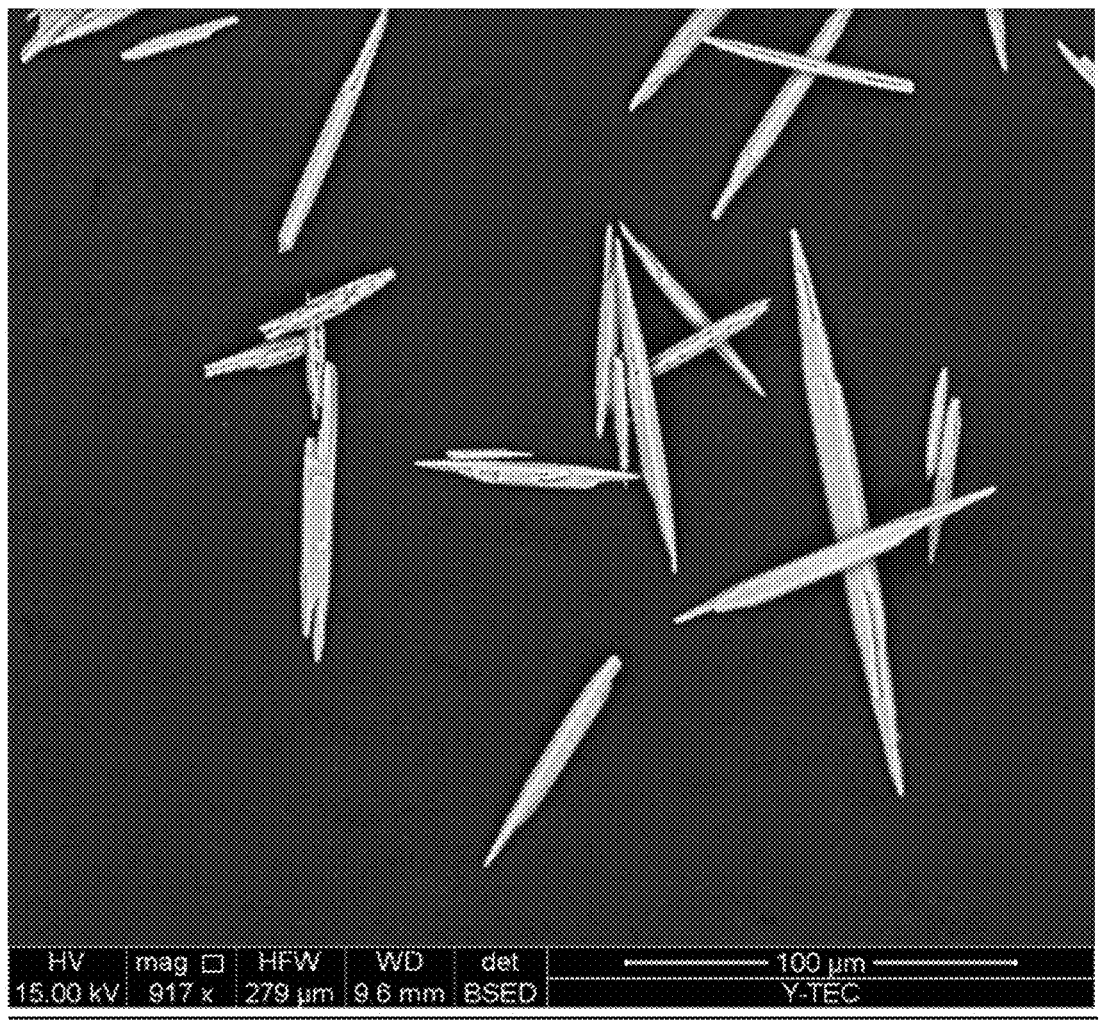

The particles obtained (Calcite) are homogeneous, dispersed, of acceptable size and have good compressive strength, but do not consolidate as spherical particles, as can be seen in FIGS. 9-10. By undergoing fracture closure pressures, these needle-shaped particles can break freeing a high content of fines into the propping agent pack. It is necessary to incorporate Zinc into the system to modify the needle-shaped particles and convert them into consolidated spheres.

Comparative Example 3

Another test similar to that of Example 3 was carried out, with the exception that the fracking fluid comprising zinc acetate, calcium chloride and fresh water was added with carbonates from the beginning, the fluid having the following composition:

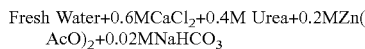
Fresh Water+0.6MCaCl$_2$+0.4M Urea+0.2MZn( AcO)$_2$+0.02MNaHCO$_3$

The tests were performed under the same conditions: 10,000 psi pressure and 220° F. temperature, for 6 h.

Figure 11:
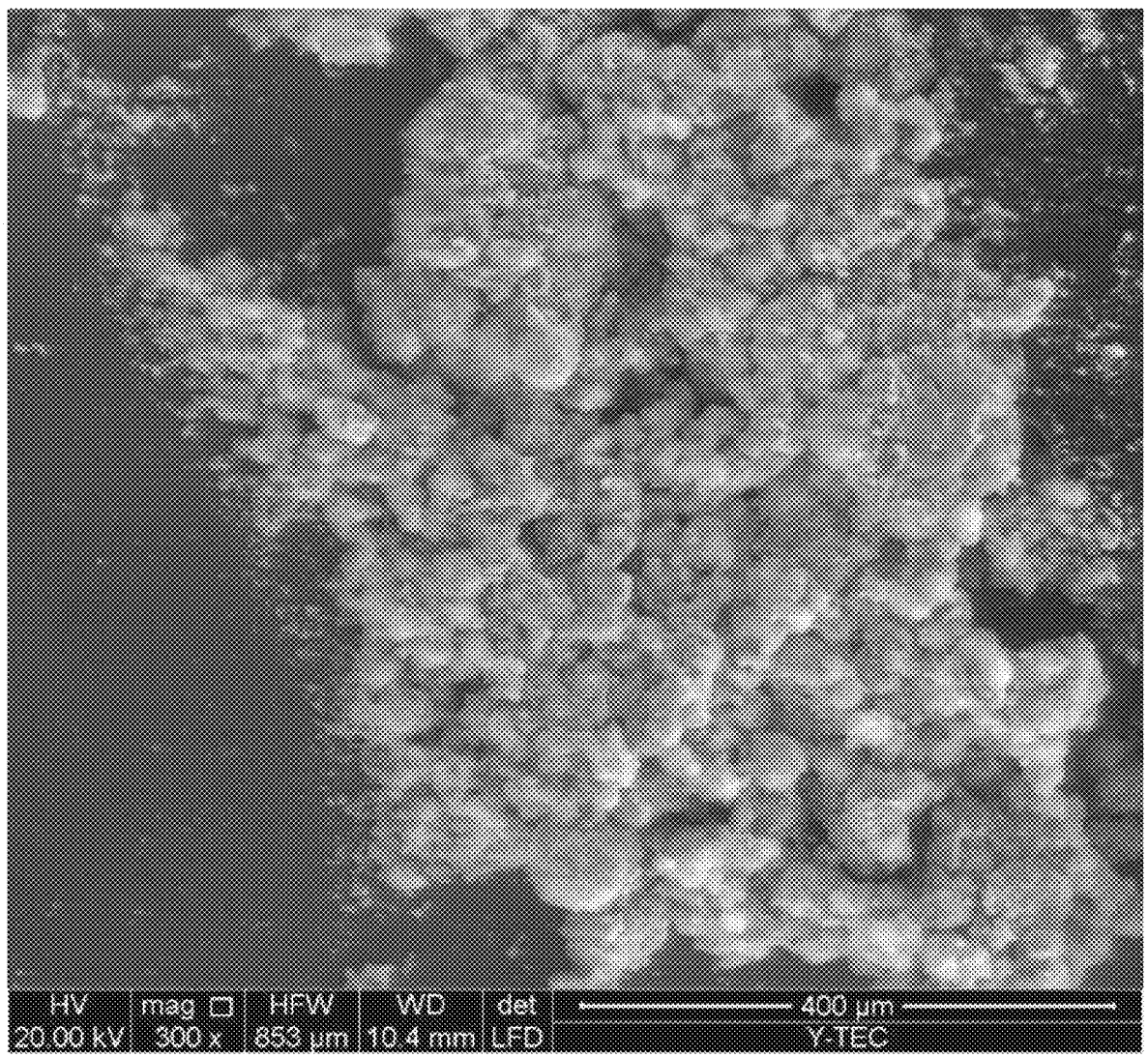
FIG. 11 shows a microscopic a view of proppant particles which are not segregated and spherical, obtained in Comparative Example 3.

As can be seen in FIG. 11, the addition of carbonate ions from the beginning does not favor the generation of segregated and spherical particles. The carbonated precipitate obtained is more like an undesirable inlay, since although it may have compressive strength, it does not have a permeable structure that allows fluid movement. This type of precipitate can cause the opposite effect to the desired one, obstructing the permeable channels and decreasing the fracture conductivity.

To avoid the formation of such structures, the carbonate ions necessary for the generation of useful particles must inevitably be released into the fracture fluid in a controlled manner. This is achieved by the degradation of urea in the conditions of pressure and temperature existing within the fractures.

Comparative Example 4

Another test similar to that of Example 1 was carried out, with the exception that the fracking fluid was prepared by adding zinc acetate and urea into Flowback water and then tested at 100 psi (instead of 10,000 psi) and 220° F., for 48 hours, in static conditions. This test was performed with a fluid having the following composition:

Flowback Water+0.4M Urea+0.2MZn(AcO)$_2$

Figure 12:
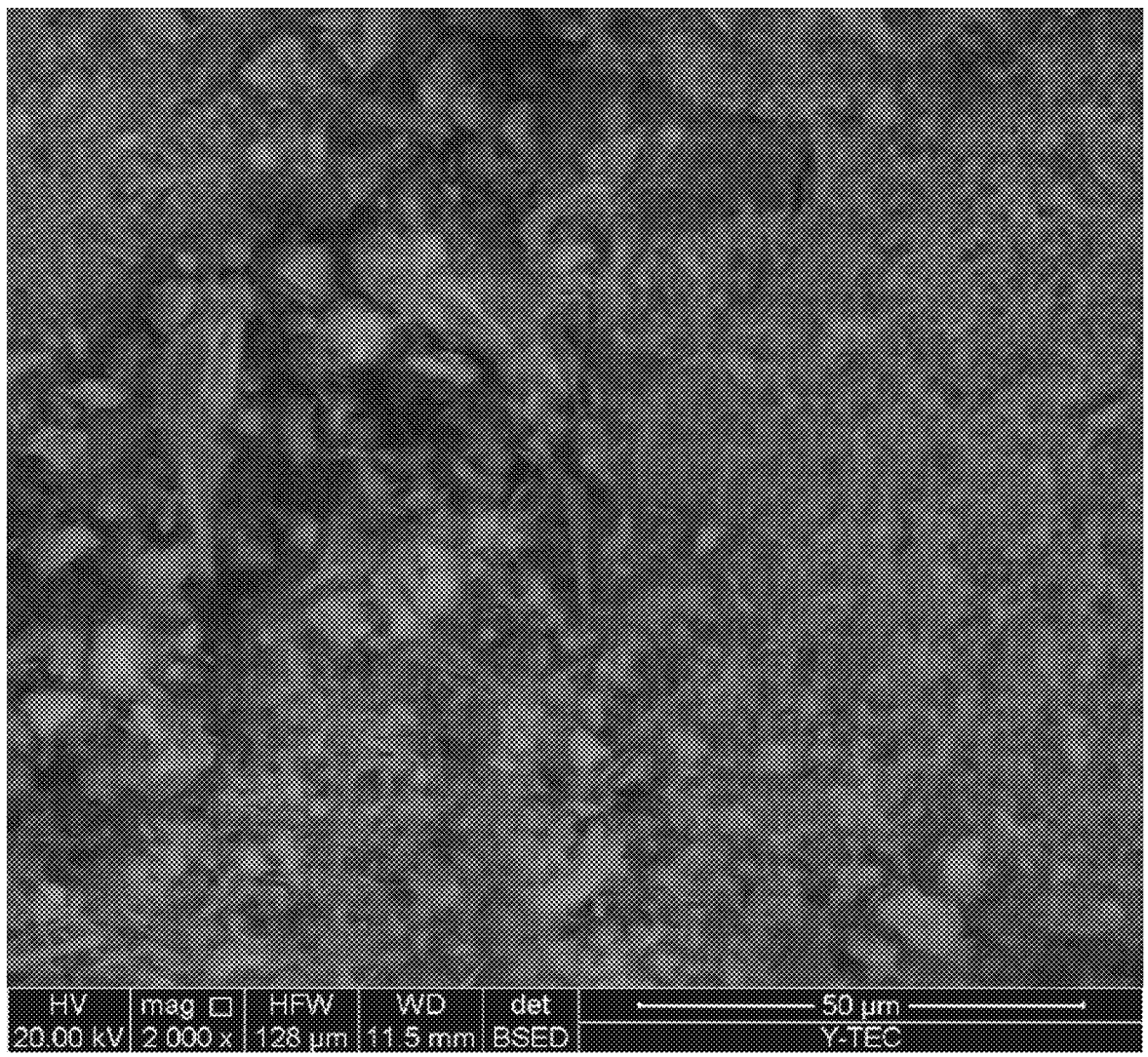
FIG. 12 shows a microscopic a view of proppant particles with a powdery appearance and disperse agglomerates, obtained in Comparative Example 4.

Flowback Water=0.6MCaCl$_2$+5.81×10$^{-4}$MBaCl$_2$+0.22MMgCl$_2$+5.12×10MNaHCO$_3$+1.38MNaCl Surprisingly, the particles obtained at low pressure were not completely consolidated, with a powdery appearance and disperse agglomerates, with an average particle size below 10 µm, as can be seen in FIG. 12.

These comparative results, when compared to the results of Examples 1-3, show that no person skilled in the art could have envisioned that the fracking fluid of the invention, comprising water, zinc salts and a carbonate ion generating compound, would produce high quality proppants when injected into a shale rock formation and submitted to downhole conditions.

The invention claimed is:

1. A method of fracking a shale formation and propping up shale rock fractures comprising the steps of:
   a) mixing water with a soluble calcium salt;
   b) adding to the mixture obtained in a) a carbonate ion generating compound
   c) adding to the mixture obtained in b) a soluble zinc salt, obtaining thus a hydraulic aqueous fluid;
   d) injecting under pressure the hydraulic aqueous fluid obtained in c) into the shale rock formation in order to produce rock fractures; and
   e) letting the injected hydraulic aqueous fluid to warm under the temperature and pressure conditions within the formation in order to generate carbonate ions from the carbonate ion generating compound and produce a calcium/zinc carbonate precipitate that will prop up the rock fractures.

2. The method according to claim 1, wherein the water is fresh water or salt water.

3. The method according to claim 1, wherein the water source is selected from rivers or other water streams and groundwater.

4. The method according to claim 1, wherein the water source is production water or flowback from oil well exploitation.

5. The method according to claim 1, wherein water also comprises monovalent cation salts.

6. The method according to claim 1, wherein the water comprises calcium salts.

7. The method according to claim 1, wherein the soluble calcium salt is selected from the group of calcium chloride, calcium bromide or calcium fluoride.

8. The method according to claim 7, wherein the calcium salt is in a concentration between 0.4 and 2.4 M of equivalent calcium.

9. The method according to claim 1, wherein the soluble zinc salt is selected from the group of zinc acetate, zinc nitrate, zinc chloride, zinc hydroxide or zinc sulfide.

10. The method according to claim 9, wherein the soluble zinc salt is in a concentration between 0.1 and 0.4 M of equivalent zinc.

11. The method according to claim 1, wherein the carbonate ion generating compound is urea.

12. The method according to claim 11, wherein the carbonate ion generating compound is in a concentration between 0.4 and 2 M.

* * * * *